Sept. 21, 1965  F. A. HEINZ, JR  3,206,927
NORMAL SHOCK WAVE POSITIONING SYSTEM
Filed Sept. 27, 1963
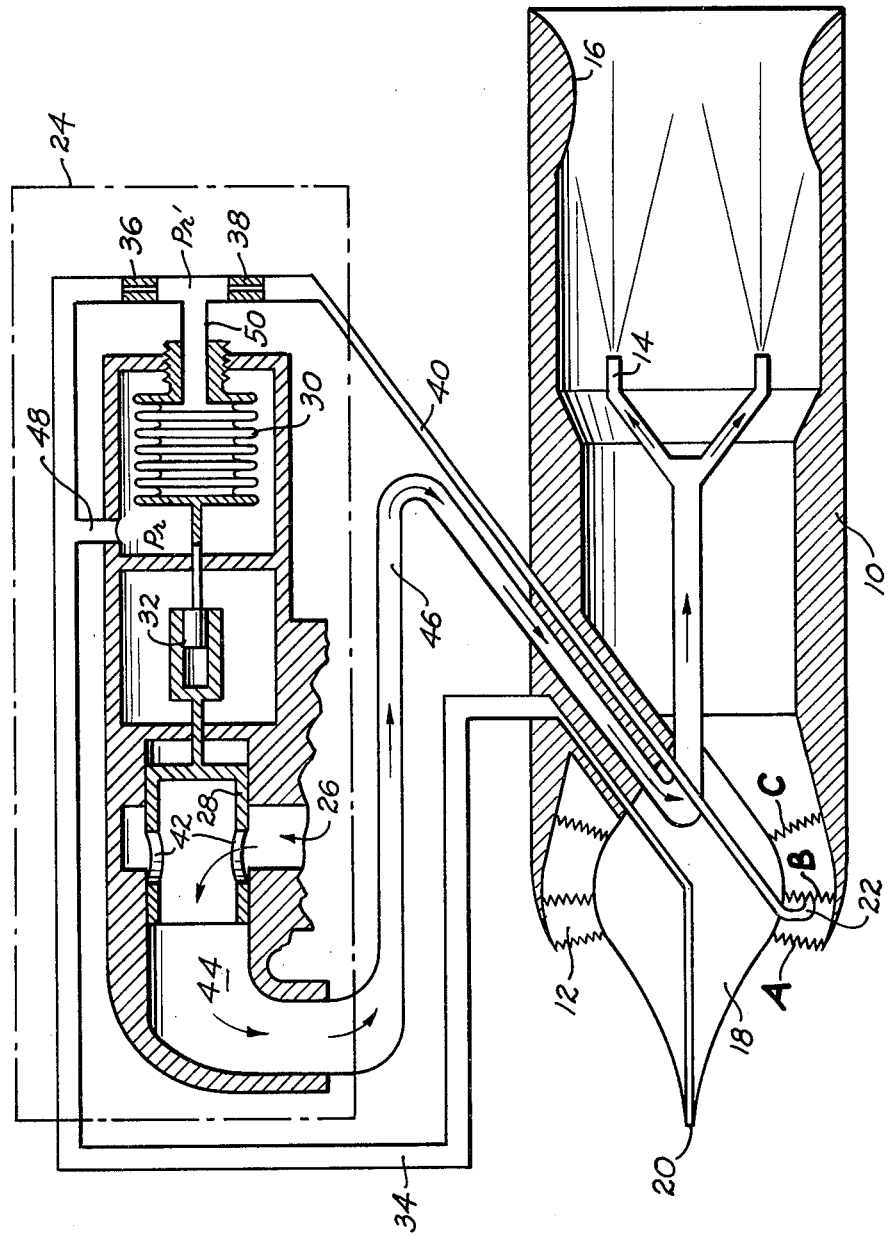
INVENTOR.
FRANCIS A. HEINZ JR.
BY
William N. Antonis
ATTORNEY.

United States Patent Office 3,206,927
Patented Sept. 21, 1965

3,206,927
NORMAL SHOCK WAVE POSITIONING SYSTEM
Francis A. Heinz, Jr., Mishawaka, Ind., assignor to The Bendix Corporation, Mishawaka, Ind., a corporation of Delaware
Filed Sept. 27, 1963, Ser. No. 312,148
6 Claims. (Cl. 60—35.6)

This invention relates to ram-jet engines and more particularly to a normal stock wave positioning system for use in connection therewith.

In this connection it is an object of this invention to provide a system for use with ram-jet engines which will maintain the normal shock wave at the optimum position for maximum engine pressure recovery, thereby contributing to the achievement of a maximum range for supersonic aircraft such as missiles.

Another object of this invention is to provide a device which will position the normal shock wave in the inlet of a supersonic ram-jet engine by controlling the main fuel flow in a split type combustor.

More specifically, it is an object of this invention to provide a device which will position the normal shock wave in a supersonic engine at the desired position by sensing the pressure differentials across the normal shock wave and varying the fuel flow to the engine accordingly.

Another object of this invention is to provide a normal shock wave position device which is capable of overriding the main fuel control system of a ram-jet engine by changing the pressure differential across a ram bellows as a function of normal shock wave position.

The above and other objects and features of the invention will be apparent from the following description taken in connection with the accompanying drawing which forms a part of this specification, and in which the single figure schematically illustrates an engine, a portion of a constant head fuel regulator, and my novel normal shock wave positioning control.

Referring to the drawing, it will be noted that the numeral 10 designates an engine having a diffuser inlet 12, a combustor 14, and an exit nozzle 16. Located in inlet 12 is an innerbody 18, a ram pressure sensing probe 20, and a normal shock wave sensing probe 22.

The numeral 24 designates a portion of a constant head fuel regulator which includes a fuel inlet 26, a fuel metering valve 28, a differential ram pressure bellows 20, and a conventional hydraulic force amplifying servo 32 operatively connecting the metering valve 28 with the bellows 30 so that movement of the bellows will cause concomitant movement of the metering valve. The fluid flow passage connecting the ram pressure sensing probe with the normal shock wave sensing probe includes a conduit 34, a first orifice or restriction 36, having a predetermined fixed effective flow area, a second orifice or restriction 38 having a fixed effective flow area, and a conduit 40. Regulated fuel will flow to the combustor 14 via fuel inlet 26, ports 42 of metering valve 28, chamber 44, and conduit 46. Fuel flow is metered linearly with ram pressure ($P_r$) by applying ram pressure ($P_r$) to one side of ram bellows 30 via conduit 48 and metered ram pressure ($P_r'$) to the other side of the bellows via conduit 50 which is located between first and second restrictions 36 and 38. Since the fuel metering valve 28 is operatively connected to the bellows 30 through the hydraulic servo 32, the position of the valve is determined by the position of the bellows.

Operation of the device will be as follows: The fuel regulator 24 will meter full rich fuel proportional to ram pressure ($P_r$) to the engine as long as a sonic flow condition exists across restriction 38. When the normal shock wave is behind the normal shock wave sensing probe 22 (see position C), the sonic flow condition will exist and the differential pressure across bellows 30 will be such that the metering valve 28 will be positioned in its more opened position. With the metering valve in the more opened position, the full rich fuel flow to the engine which results will be sufficient to expel the normal shock wave to a position forward of the normal shock wave sensing probe 22 (see position A). However, when the normal shock wave is forward of the normal shock wave sensing probe, namely in position A, the pressure to which restriction 38 exhausts will be equal to or greater than ram pressure ($P_r$). When this condition occurs, the metered ram pressure ($P_r'$) will increase and will cause movement of the metering valve 28 in a direction tending to close off the metering valve ports 42. Such movement will result in a reduction in fuel flow to the engine sufficient to in effect swallow the normal shock wave behind the normal shock wave sensing probe 22. The control is based on the fact that fuel flow can be programmed so that full rich flow will be sufficient to move the shock wave forward over the normal shock wave sensing probe 22, and little or no flow will be sufficient to move the shock wave behind the probe 22. In this manner the control will tend to seek a fuel flow which will keep the normal shock wave substantially at the normal shock wave sensing probe, as indicated by position B. Thus, with the proper dynamic considerations, the normal shock wave can be positioned in the desired location (position B) for maximum engine pressure recovery.

Although this invention has been described in connection with a specific embodiment, it will be understood that various changes in the form and relative arrangement of parts may be made to suit other requirements and that the principles are susceptible of numerous other applications that will readily occur to persons skilled in the art. Accordingly, I do not desire to be limited to the specific embodiment disclosed herein primarily for purposes of illustration, but instead desire protection falling within the scope of the appended claims.

Having thus described the various features of the invention what I claim as new and desire to secure by Letters Patent is:

1. A system for securing maximum pressure recovery in a ram-jet engine by controlling the position of the normal shock wave in the ram-jet diffuser inlet through variations in fuel flow to the ram-jet combustor comprising an engine housing, a movable fuel metering valve for controlling fuel flow to said combustor, a first probe located in said housing for sensing ram pressure, a second probe located in said housing for sensing diffuser pressure, a fluid flow passage connecting said first and second probes, first and second orifices located in said passage in series flow relationship, said first and second orifices each having predetermined fixed effective flow areas, a pressure responsive element having one side thereof exposed to ram pressure and the other side thereof exposed to the pressure existing between said first and second orifices, and force amplifying means operatively connecting said pressure responsive element with said fuel metering valve for causing movement of said valve in a direction tending to reduce fuel flow to said combustor when the diffuser presure increases relative to said ram pressure and for causing movement of said valve in the opposite direction tending to increase fuel flow to said combustor when the diffuser presure decreases relative to said ram pressure, said variations in fuel flow tending to stabilize at an intermediate flow rate thereby causing, said normal shock wave to be positioned substantially at the location of said second probe.

2. A system for securing maximum pressure recovery in a ram-jet engine, as defined in claim 1, wherein said first probe is at the outermost tip of an innerbody member located in the diffuser inlet of the engine housing and said second probe is located in the diffuser inlet between the innerbody member and the engine housing.

3. A system for securing maximum pressure recovery in a ram-jet engine, as defined in claim 1, wherein said pressure responsive element is a bellows the outside of which is exposed to ram pressure and the inside of which is exposed to the presure existing between the first and second orifices.

4. A system for securing maximum pressure recovery in a ram-jet engine by controlling the position of the normal shock wave in the ram-jet diffuser inlet through variations in fuel flow to the ram-jet combustor comprising a movable fuel metering valve for controlling fuel flow to said combustor, a fluid flow passage connected between a ram pressure source and a diffuser pressure source, first and second orifices located in said passage in series flow relationship, said first and second orifices each having predetermined fixed effective flow areas, a pressure responsive element having one side thereof exposed to ram pressure and the other side thereof exposed to the pressure existing between said first and second orifices, and means operatively connecting said pressure responsive element with said fuel metering valve for causing movement of said valve in a direction tending to reduce fuel flow to said combustor when the diffuser pressure increases relative to said ram pressure and for causing movement of said valve in the opposite direction tending to increase fuel flow to said combustor when the diffuser pressure decreases relative to said ram pressure to thereby cause said normal shock wave to be positioned substantially at the point of the diffuser pressure source.

5. A system for securing maximum pressure recovery in a ram-jet engine by controlling the position of the normal shock wave in the ram-jet diffuser inlet through variations in fuel flow to the ram-jet combustor comprising means for controlling fuel flow to said combustor, fluid passage means connected between a ram pressure source and a diffuser pressure source, first and second orifices located in said passage means in series flow relationship, said first and second orifices each having predetermined fixed effective flow areas, and movable pressure responsive means having one side thereof exposed to ram pressure and the other side thereof exposed to the pressure existing between said first and second orifices, said movable pressure responsive means being operatively connected to said fuel control means for causing said fuel control means to reduce fuel flow to said combustor when the diffuser pressure increases relative to said ram pressure and to increase fuel flow to said combustor when the diffuser pressure decreases relative to said ram pressure to thereby cause said normal shock wave to be positioned substantially at the point of the diffuser pressure source.

6. A system for securing maximum pressure recovery in a ram-jet engine by controlling the position of the normal shock wave in the ram-jet diffuser inlet through variations in fuel flow to the ram-jet combustor comprising means for controlling fuel flow to said combustor, fluid passage means connected between a ram pressure source and a diffuser pressure source, first and second orifices located in said passage means in series flow relationship, said first and second orifices each having predetermined fixed effective flow areas, means movably responsive to the differential between ram pressure and the pressure existing between said first and second orifices, said movably responsive means being operatively connected to said fuel control means for decreasing or increasing fuel flow from said fuel control means as a function of diffuser pressure, which diffuser pressure varies with the position of the normal shock wave, to thereby cause said normal shock wave to be positioned substantially at the point of the diffuser pressure source.

References Cited by the Examiner
UNITED STATES PATENTS

| | | | |
|---|---|---|---|
| 2,693,675 | 11/54 | Schaffer | 60—35.6 X |
| 2,873,756 | 2/59 | Pool | 60—35.6 X |
| 2,882,680 | 4/59 | Jamison | 60—39.28 |
| 2,969,939 | 1/61 | Sulkin. | |
| 3,002,348 | 10/61 | Haase | 60—39.28 |
| 3,060,684 | 10/62 | Holmes | 60—35.6 |
| 3,078,658 | 2/63 | Sargent | 60—35.6 |

SAMUEL LEVINE, *Primary Examiner.*

MARK NEWMAN, *Examiner.*